Feb. 11, 1941.  O. FIRING  2,231,286
METHOD AND APPARATUS FOR FORMING AND ATTACHING SLIDE FASTENER ELEMENTS
Filed July 17, 1937  12 Sheets-Sheet 4
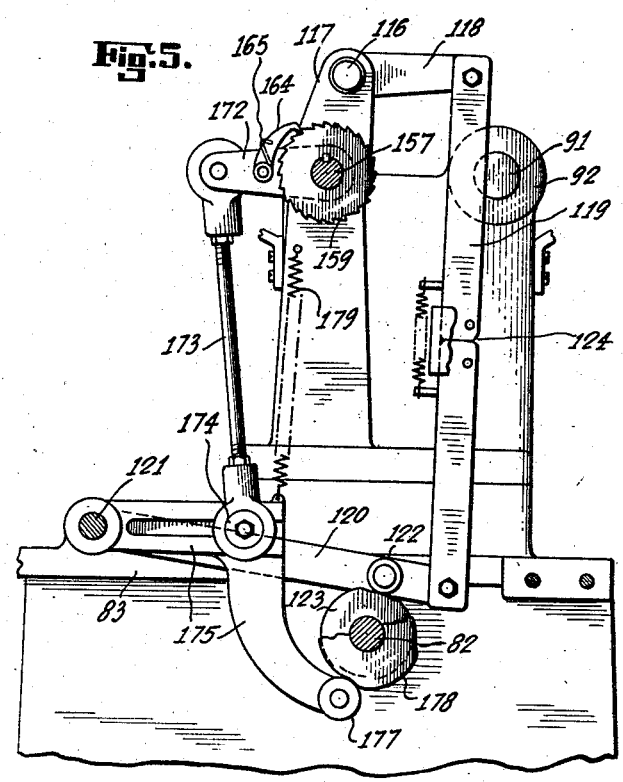
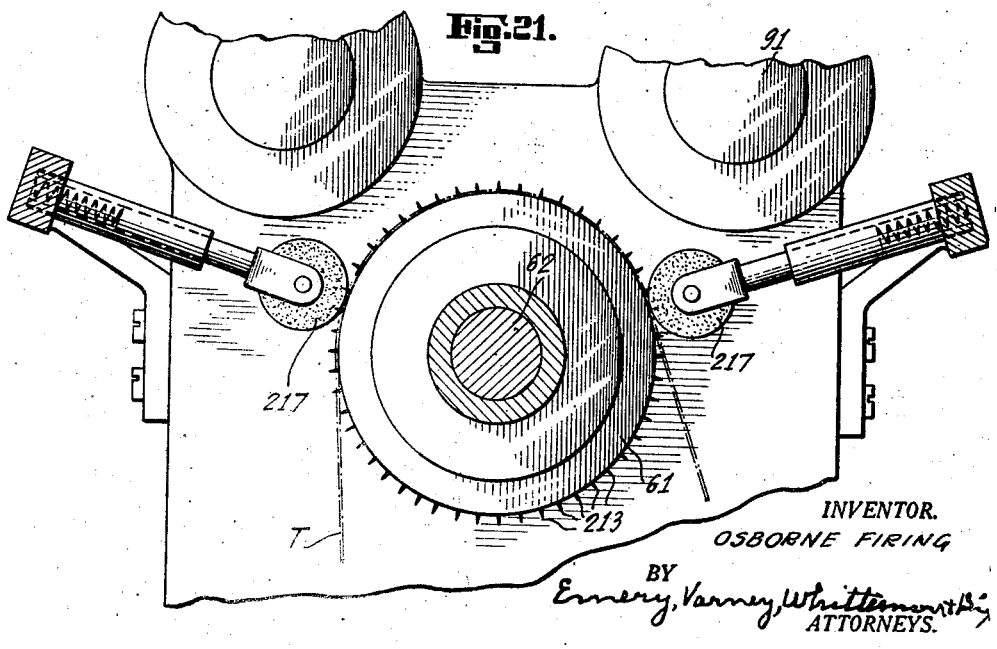
INVENTOR.
OSBORNE FIRING
BY
Emery, Varney, Whittemore
ATTORNEYS.

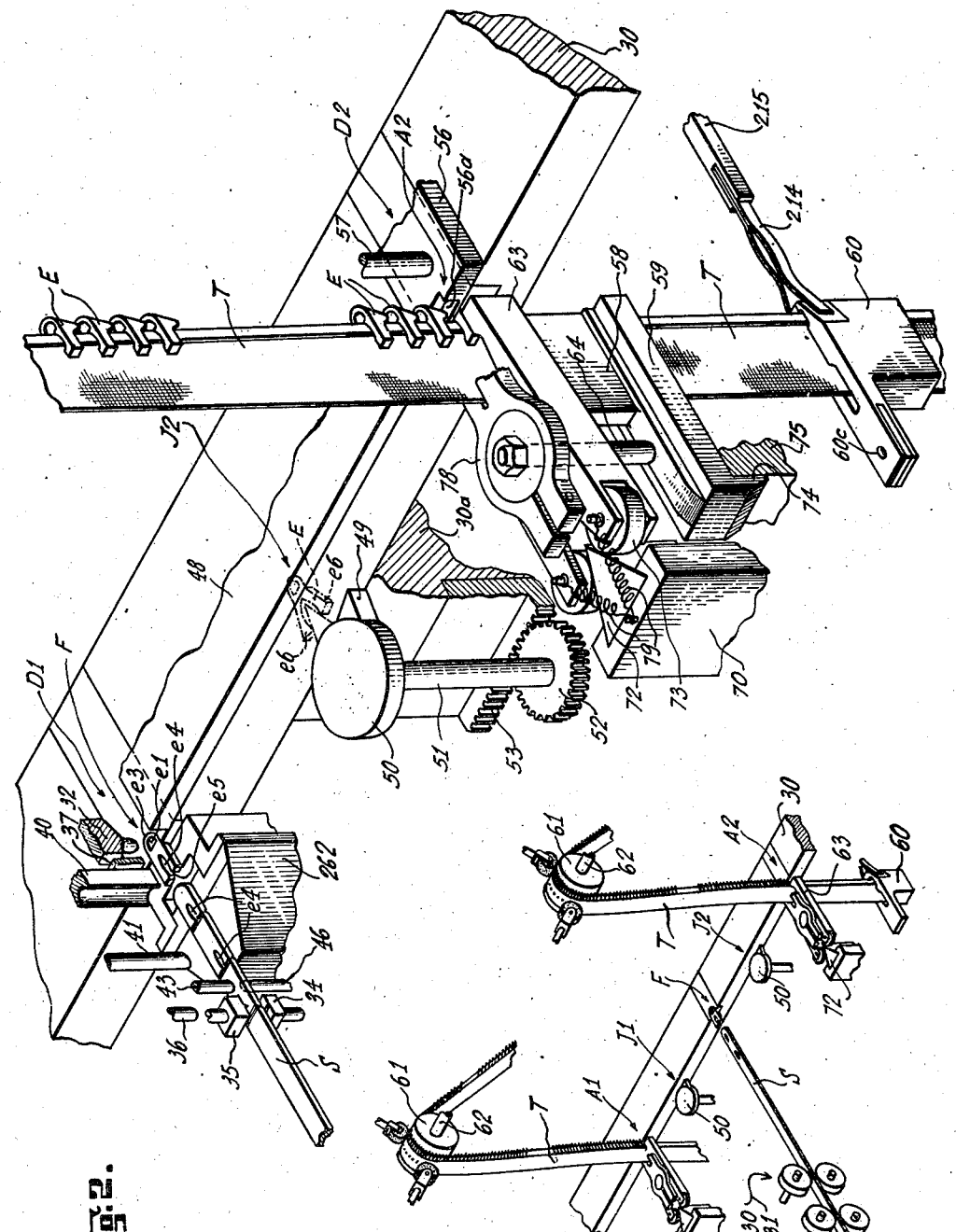
Feb. 11, 1941.    O. FIRING    2,231,286
METHOD AND APPARATUS FOR FORMING AND ATTACHING SLIDE FASTENER ELEMENTS
Filed July 17, 1937    12 Sheets-Sheet 1
INVENTOR.
OSBORNE FIRING
BY
Emery, Varney, Whittemore & Dix
ATTORNEYS.

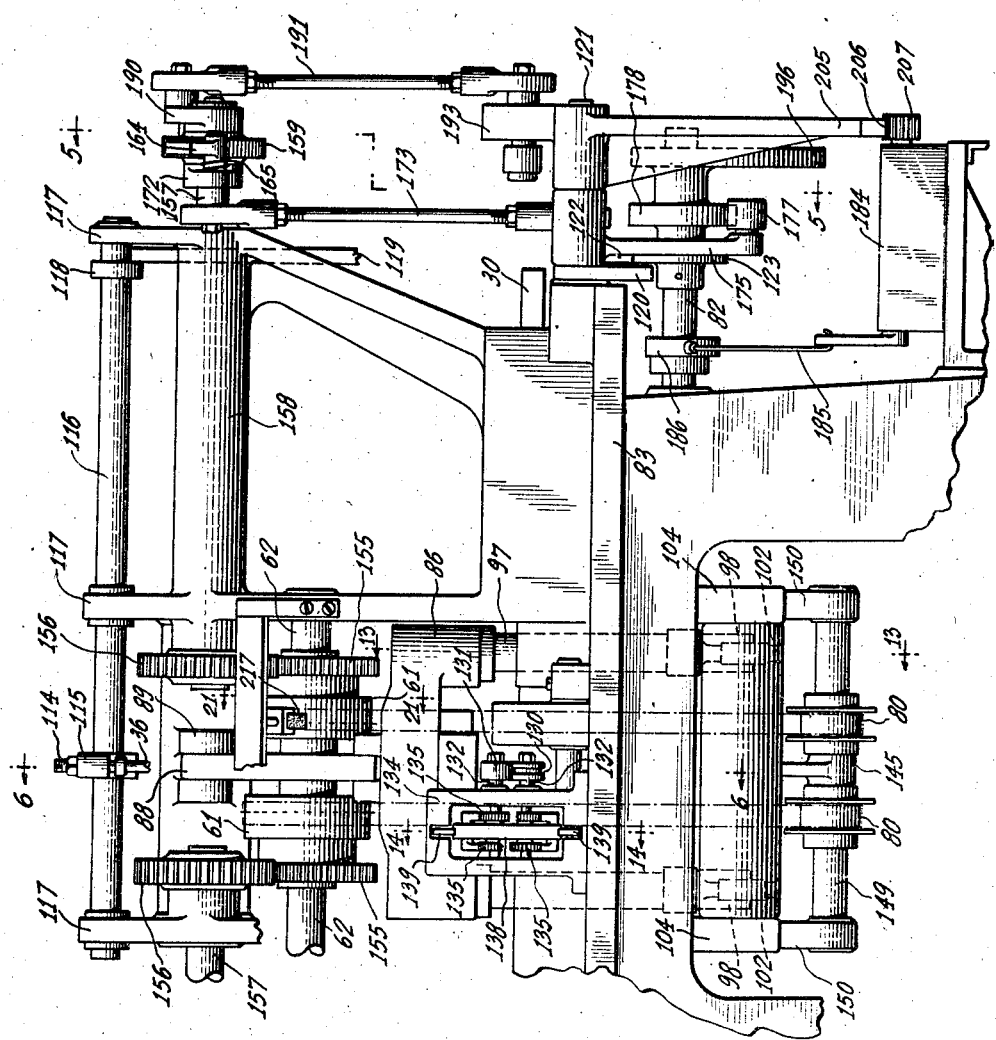

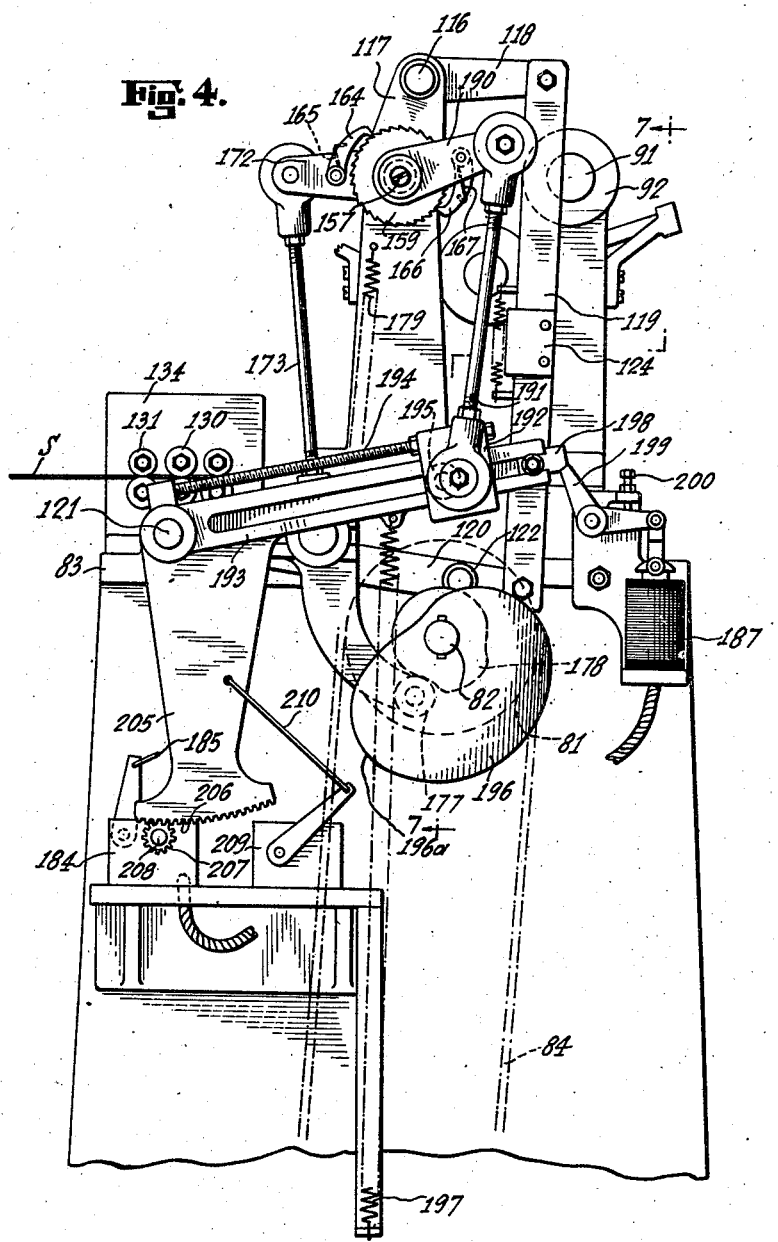

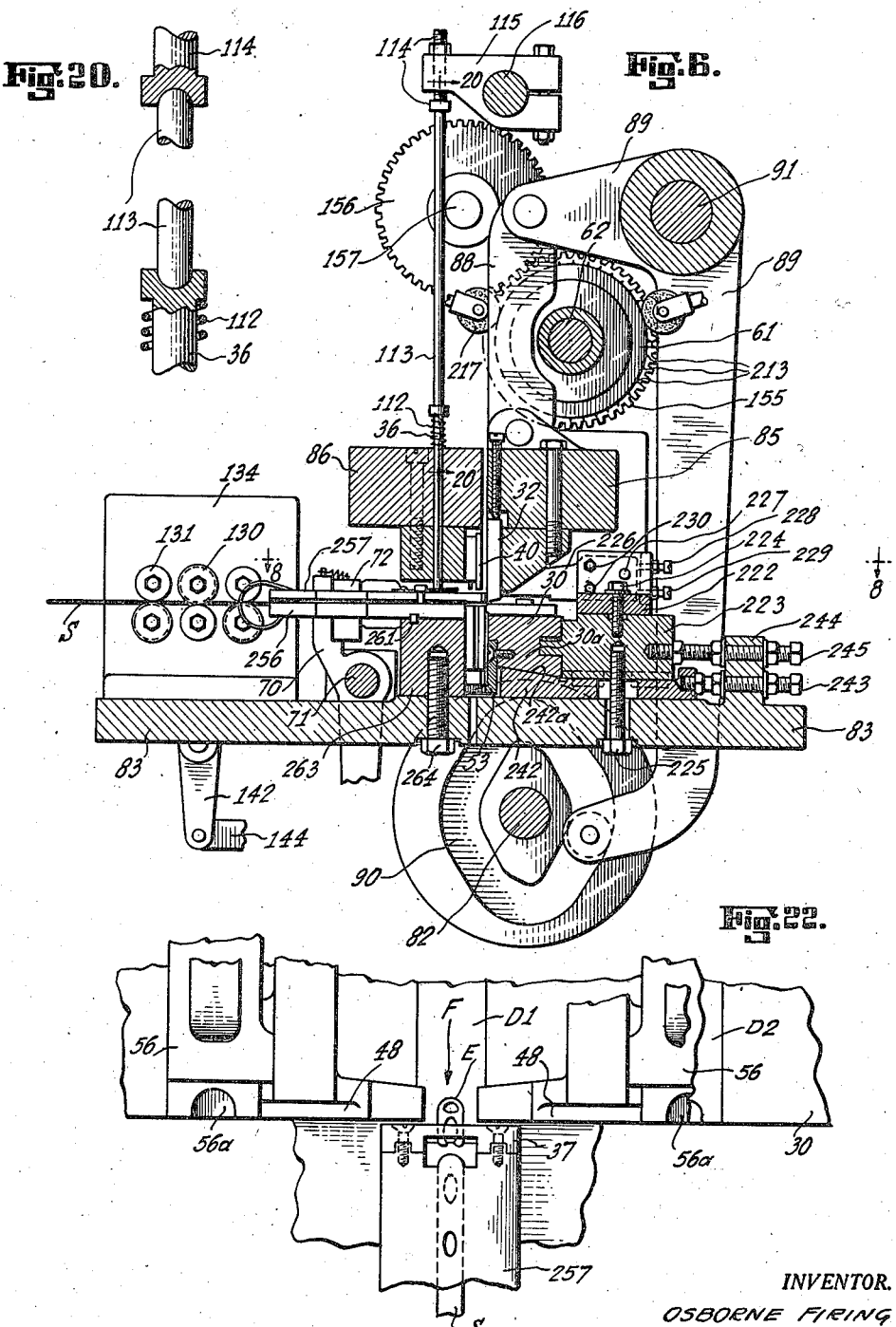

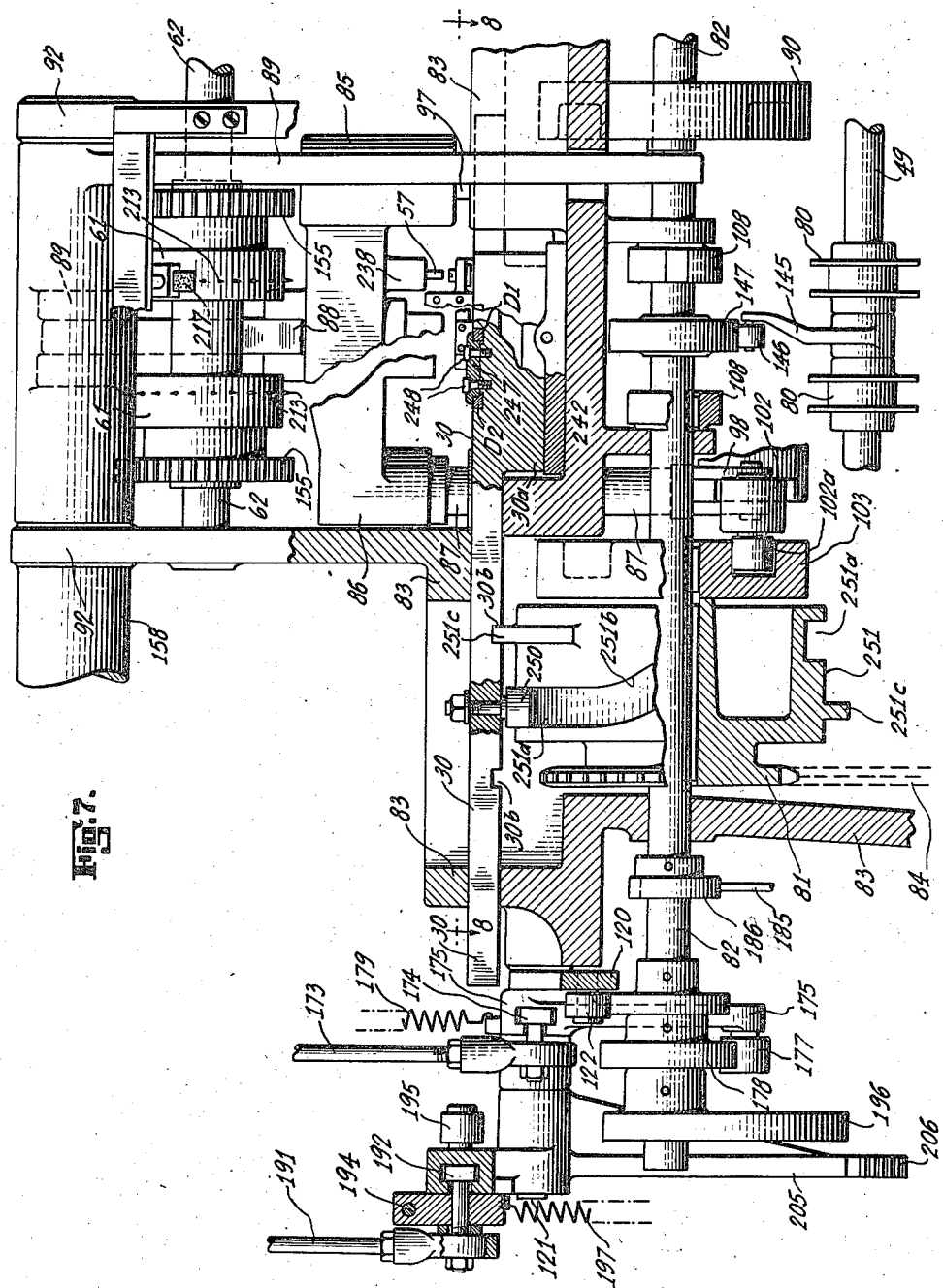

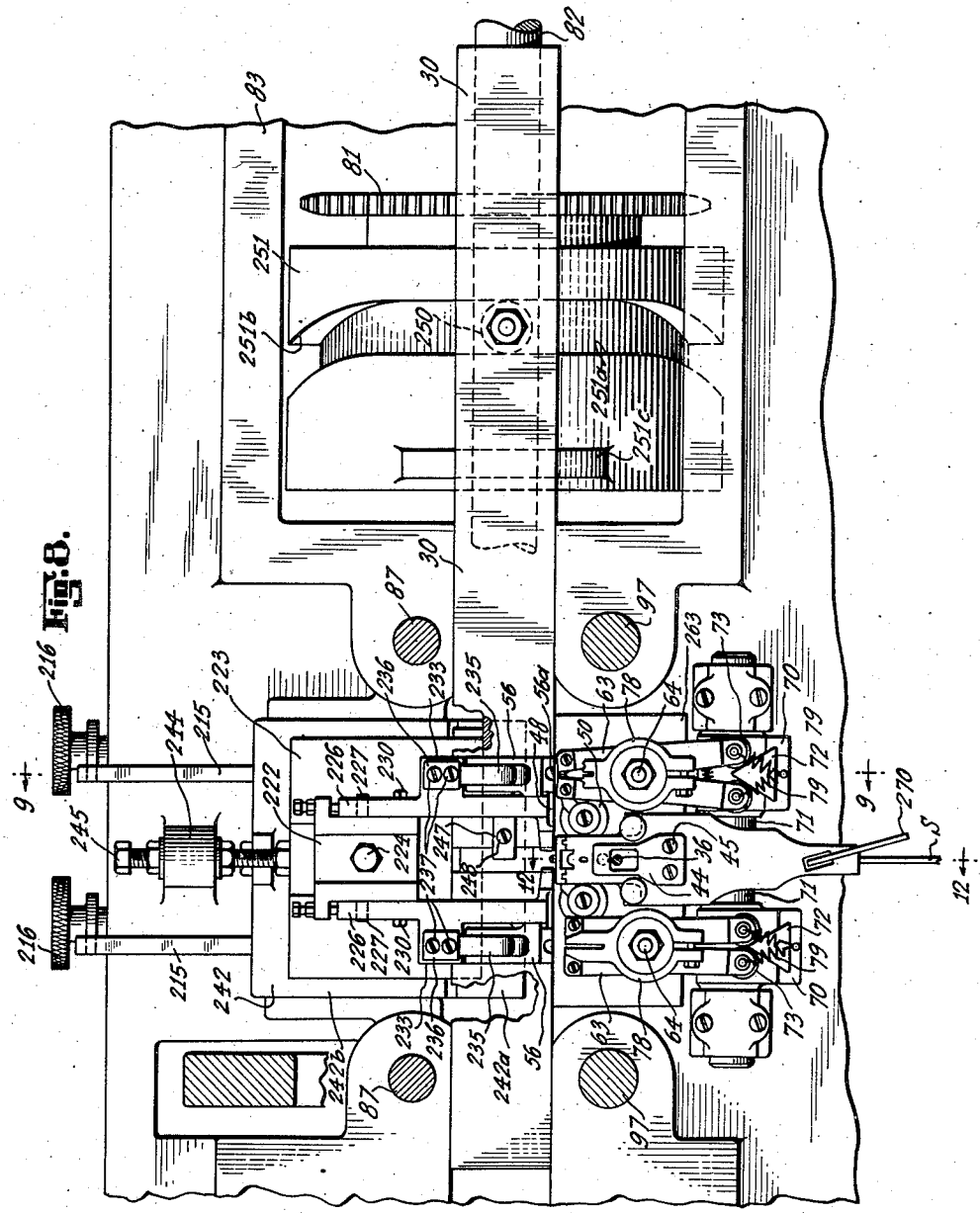

Feb. 11, 1941.   O. FIRING   2,231,286
METHOD AND APPARATUS FOR FORMING AND ATTACHING SLIDE FASTENER ELEMENTS
Filed July 17, 1937   12 Sheets-Sheet 8

INVENTOR.
OSBORNE FIRING
BY
Emery, Varney, Whittemore & K.
ATTORNEYS.

Feb. 11, 1941.    O. FIRING    2,231,286
METHOD AND APPARATUS FOR FORMING AND ATTACHING SLIDE FASTENER ELEMENTS
Filed July 17, 1937    12 Sheets-Sheet 9

INVENTOR.
OSBORNE FIRING
BY
Emery, Varney, Whittemore & Bix
ATTORNEYS.

Feb. 11, 1941.  O. FIRING  2,231,286
METHOD AND APPARATUS FOR FORMING AND ATTACHING SLIDE FASTENER ELEMENTS
Filed July 17, 1937  12 Sheets-Sheet 10
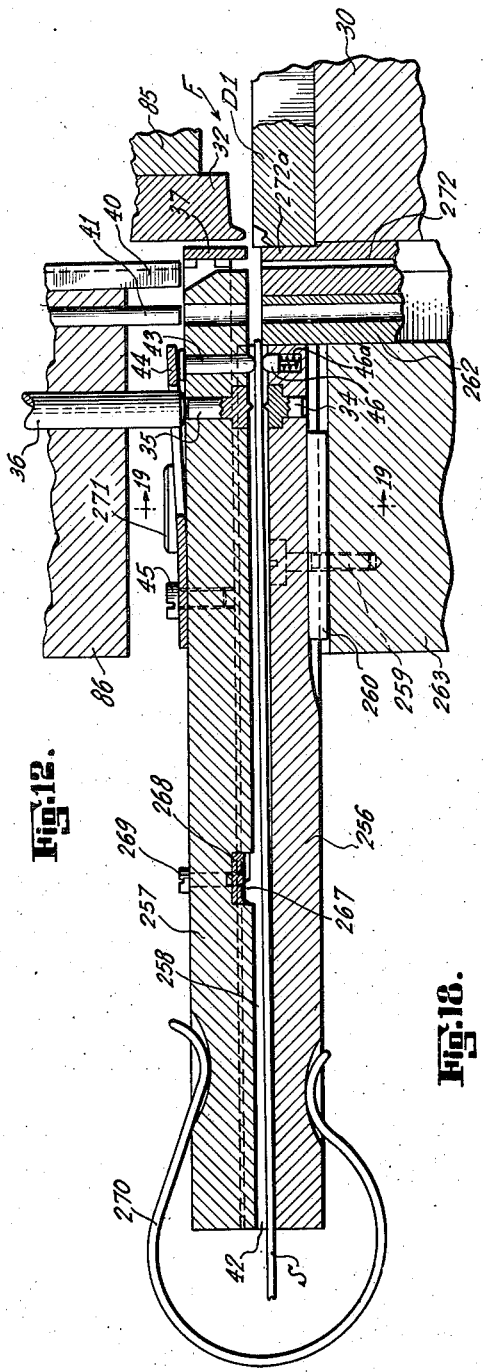
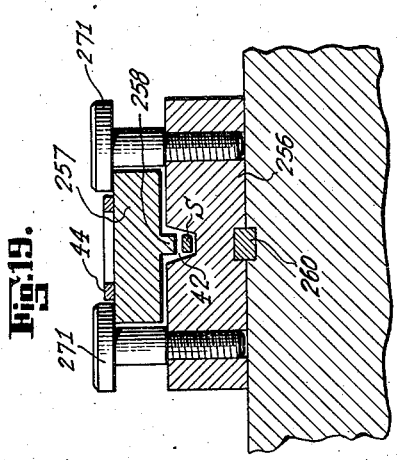
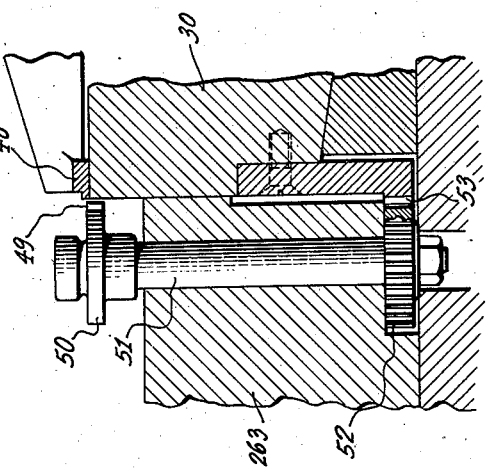
INVENTOR.
OSBORNE FIRING
BY
Emery, Varney, Whittemore & Dix
ATTORNEYS.

Feb. 11, 1941.    O. FIRING    2,231,286
METHOD AND APPARATUS FOR FORMING AND ATTACHING SLIDE FASTENER ELEMENTS
Filed July 17, 1937    12 Sheets-Sheet 11

INVENTOR.
OSBORNE FIRING
BY
Emery, Varney, Whittemore & Dix
ATTORNEYS.

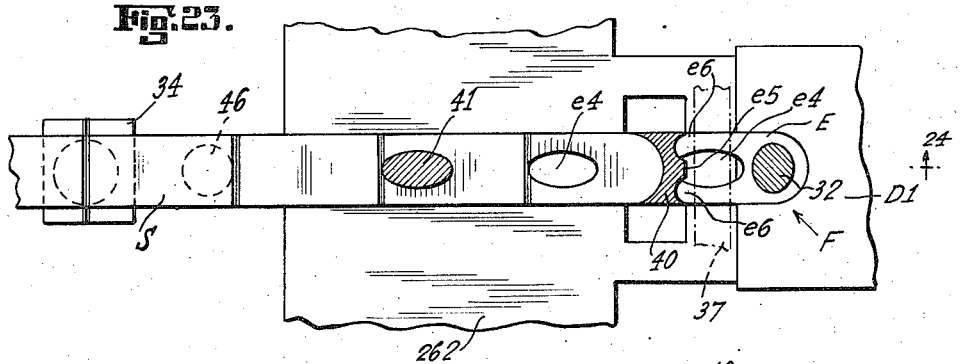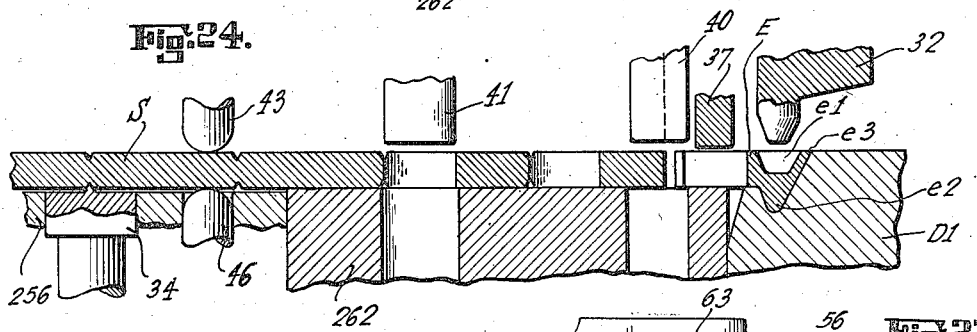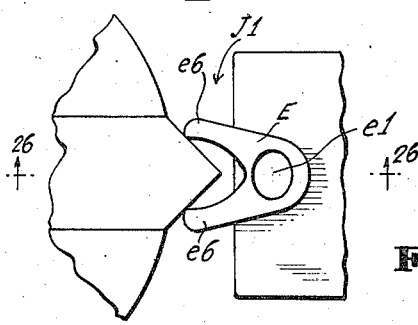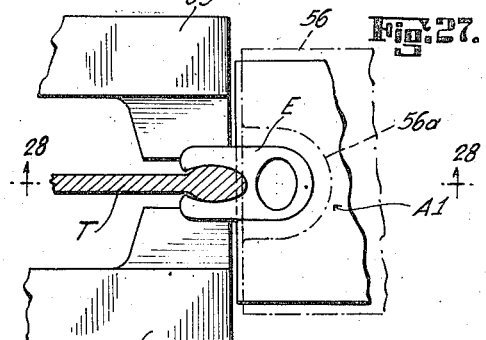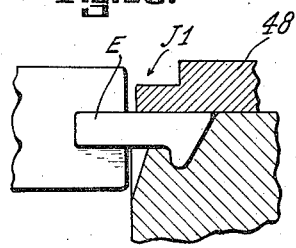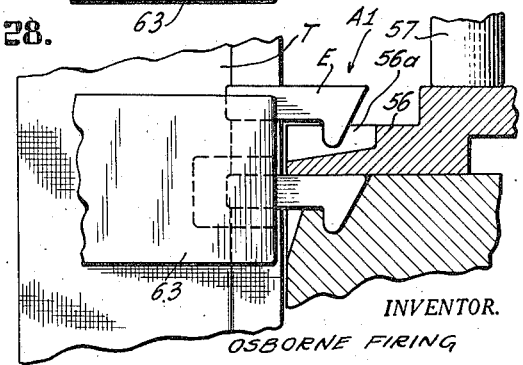

Patented Feb. 11, 1941

2,231,286

UNITED STATES PATENT OFFICE 2,231,286

METHOD AND APPARATUS FOR FORMING AND ATTACHING SLIDE FASTENER ELEMENTS

Osborne Firing, New Dorp, Staten Island, N. Y., assignor to William Strauss, New York, N. Y.

Application July 17, 1937, Serial No. 154,184

39 Claims. (Cl. 153—1)

This invention relates to slide fasteners, more particularly to a method of and apparatus for forming interlocking slide fastener elements, and attaching them to carriers, tapes or stringers, and has for an object the provision of improvements in this art.

There have been a number of methods heretofore proposed for producing slide fastener elements from metal stock. There are, in fact, many types of fastener elements but the type here considered is the conventional type of rectangular block shape having solid heads comprising opposed interfitting or nesting projections and recesses at one end for inter-connection by a gear-toothlike meshing action and spaced clamping jaws at the other end for securing the interlocking elements upon a carrier, tape or stringer.

According to one known method, the elements are punched from a wide sheet of metal stock. This entails obvious waste of stock and has many other objections.

According to another method, the elements are sliced from the end of Y-bar stock corresponding to the shape of the elements. Here the elements are likely to be deformed because of the large area placed in shear.

According to another method, the elements are swaged from round wire stock and then cut off in groups and finished, the wire stock being approximately equal to the final cross-sectional size of the elements but requiring complete reshaping. This method is subject to the well-known objections inherent in swaging operations, particularly as regards very small articles. One great objection is that the swaging operation causes considerable elongation of the stock and consequent disorganization between the punching and stock-feeding or other related operations. Moreover, swaging operations may harden the stock and make subsequent operations difficult.

According to the present invention, the fastener elements are formed from wire stock which not only is of a cross-sectional size substantially equal to that of the finished elements but of a cross-sectional shape substantially the same as that of the finished elements. That is, the two cross-sectional dimensions of the wire correspond substantially to two dimensions of the finished fastener elements, so that it is only necessary to form jaws and interlocking portions to produce finished elements.

According to all of the methods mentioned above, the elements or blanks are subjected to major forming operations after they have been severed from the stock. Since the elements are so small, it is exceedingly difficult to hold and control them for such operations after they have been severed from the stock; and it is almost impossible to form perfect elements by such methods. The present invention provides that all operations in the formation of elements shall be completed before the elements are severed from the stock and it also provides that the forming operations shall be effected in such manner and with the stock so disposed as to produce elements of a very high quality. The formation of the element heads is particularly important, so it is very desirable that the heads, at least, shall be completely formed while the elements are still attached to the stock—and this means that no operation will be performed on the stock in the region of the head after it has been formed. Even a trimming or parting operation is sufficient to deform the head or at least to cause burrs or raw edges to interfere with the interlocking action of the elements. The present invention provides that the heads shall in effect be molded between a heading die and punch at the free end of the stock so as to impart to them a perfect shape and that thereafter no operation shall be performed on the elements in the vicinity of the heads.

A feature of the invention, therefore, consists in the method by which elements are formed from preformed wire stock to provide a saving in stock, in operations, and in costs.

Another feature of the invention consists in the improved method of and apparatus for manipulating the elements in carrying them to and attaching them to carriers or tapes. According to this method the elements are maintained under positive control at all times; are passed to attaching position or positions and attached to a plurality of carriers or tapes whereby to increase production without unduly speeding up critical operations; and are operated upon as they pass to the respective tapes. Another feature of the invention resides in the improved means and method provided for spacing the elements on the tapes and for securing space between groups of elements on the tapes.

Other objects and features of novelty will be apparent to those skilled in the art from the following description of an illustrative embodiment of the invention taken in connection with the accompanying drawings, in which:

Fig. 1 is a schematic perspective view showing the general organization of apparatus for forming and attaching the fastener elements, parts being shown out of proportion for clarity;

Fig. 2 is a similar partial schematic view on an enlarged scale;

Fig. 3 is a front elevation of the machine;

Fig. 4 is a right end elevation;

Fig. 5 is a vertical transverse section taken on the line 5—5 of Fig. 3;

Fig. 6 is an enlarged vertical section taken on the line 6—6 of Fig. 3;

Fig. 7 is an enlarged vertical section taken on the line 7—7 of Fig. 4;

Fig. 8 is a plan view, partly in section, taken on the line 8—8 of Figs. 6 and 7;

Fig. 12 is an enlarged vertical section taken on the line 12—12 of Fig. 8;

Fig. 18 is a vertical section taken on the line 18—18 of Fig. 11;

Fig. 19 is a vertical section taken on the line 19—19 of Fig. 12;

Fig. 20 is a vertical section taken on the line 20—20 of Fig. 6;

Fig. 21 is an enlarged vertical section taken on the line 21—21 of Fig. 3;

Fig. 22 is an enlarged plan view of parts shown in Fig. 8;

Fig. 23 is a plan view illustrating the operations on the wire stock at the element-forming station;

Fig. 24 is a vertical view taken on the line 24—24 of Fig. 23;

Fig. 25 is a plan view illustrating the operations at the element jaw-spreading station;

Fig. 26 is a vertical section taken on the line 26—26 of Fig. 25;

Fig. 27 is a plan view illustrating operations at the element-attaching station;

Fig. 28 is a vertical section taken on the line 28—28 of Fig. 27;

Figure 9:
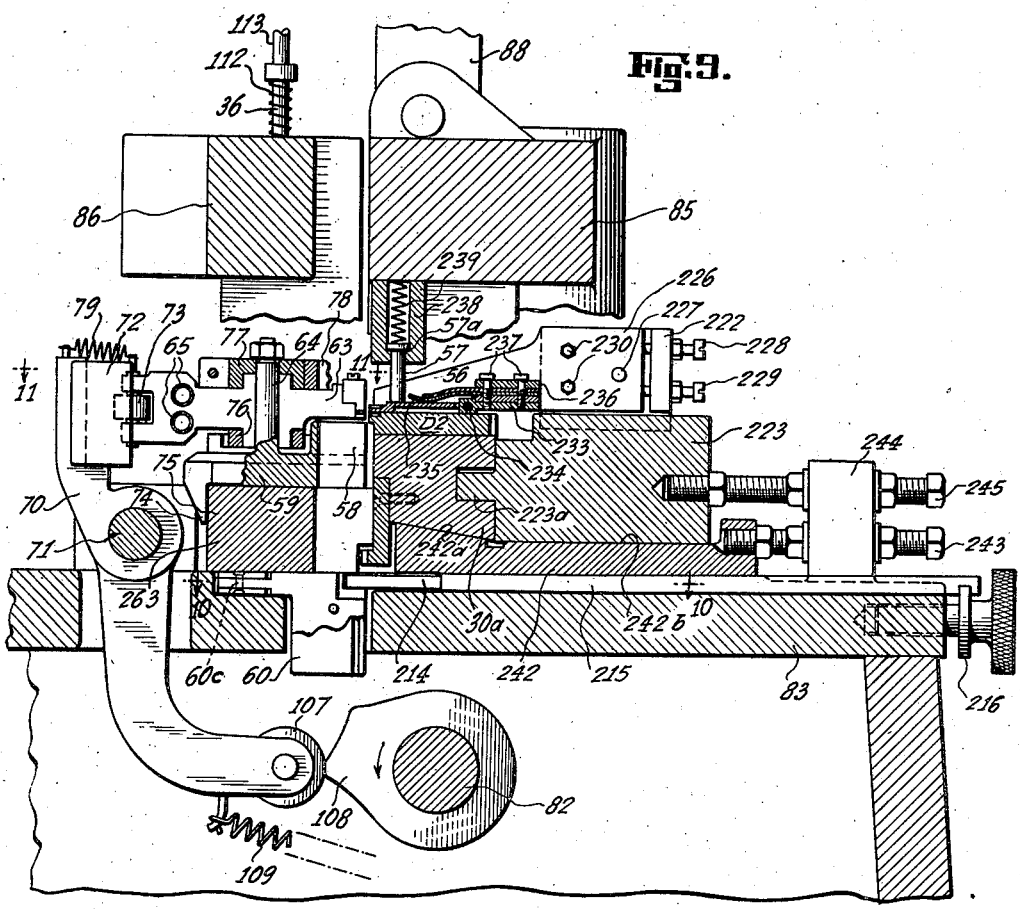
Fig. 9 is an enlarged vertical section taken on the line 9—9 of Fig. 8.

Referring to the drawings, particularly to Figs. 1 and 2, the invention contemplates the supply of wire stock S which is of rectangular shape with the corners rounded so as to obviate sharp side edges on the finished fastener elements. Preferably the wire is shaped by a previous cold rolling operation so as to have substantially the identical cross-sectional size and shape of the finished fastener elements.

The invention also contemplates the supply of suitable carriers or tapes T to which the fastener elements E are attached by appropriate jaws on the elements. The tapes are provided with thickened or beaded edges adapted to be engaged by the element jaws.

The machine takes the wire stock and automatically forms fastener elements from it and thereafter secures the formed elements on the carriers or tapes. This is accomplished without losing control of the elements at any time; that is, the elements are never collected loosely in bulk so as to require rearrangement, as would be necessary, for example, if the elements were tumbled to remove sharp edges. This is permissible because of the fact that the wire stock has such a shape and the elements are formed from it in such a manner that the finished elements do not have sharp edges at any place, or at least, not at any place where sharp edges would be objectionable.

The wire stock S is fed endwise into the machine at a forming station F. The forming operations are completed while the forward end of the wire stock, or what in effect is the forward fastener element E on the wire stock, is positioned in a die carried by a transfer member. The transfer member, here exemplified as the slide 30 having reciprocatory movement in a straight line, carries a plurality of heading dies D1, D2 (two, as shown) and moves like a shuttle to carry alternately formed elements to alternate attaching stations A1 or A2. Appropriate tapes T are fed upward under tension at the two attaching stations.

The elements as formed are engaged in the dies of the slide or shuttle only at their head ends, leaving their clamping jaws protruding clear of the edge of the slide. Moreover, as formed, the clamping jaws of the elements are in closed position. Formation in such position permits narrow wire stock to be used and this entails the minimum waste of stock as scrap. Indeed, as stated before, it permits the use of wire stock having substantially the identical cross-sectional dimensions of the finished elements. In passing from the forming station F to the attaching stations A1 or A2 the jaws of the elements are spread apart at the jaw-spreading stations J1 or J2. In the present embodiment of the invention the elements are not halted at the stations J1, J2, but are operated upon as they move past these stations.

At the attaching station the elements are halted with their open jaws in front of the beaded edge of a tape. By suitable movement the jaws are then made to straddle the beaded edge of the tape, whereupon the jaws are squeezed together to clamp them to the tape. Either the element or the tape or both may be moved to secure proper disposition for attachment but in the machine herein illustrated the tape is moved laterally edgewise or bowed into the element jaws, this permitting the use of very simple and efficient attaching mechanism, as will be seen hereinafter.

Preferably the forming mechanism at a single element forming station is made to serve a plurality of attaching stations. Ample time is thus provided for the intermittent forward feed of the tapes This is particularly advantageous when feeding the tapes forward a considerable distance for blank spaces between groups of elements, that is, during the jump feed. The spaced groups of elements on the tapes are indicated in Fig. 1. If it were necessary to stop or slow up the operation of the machine for spacing, the output would be greatly curtailed, but by the employment of a plurality of attaching stations for a single forming station an ample period is allowed for feeding the tapes and the output per unit of machinery, floor space and operators is enhanced.

In the present embodiment the elements as formed are alternately transferred to alternate attaching stations. While an element is being attached to a tape at one attaching station, another element is being completed at the forming station and the tape is being fed upward at the other attaching station.

In Fig. 2 the operations at the forming station and at the jaw-spreading and attaching stations on one side of the forming station are illustrated on an enlarged scale. It is to be understood that the mechanism on the other side is identical with that shown in Fig. 2, so the illustration of parts on one side will serve for both. Reference may also be made to diagrammatic Figures 23 to 28.

Assuming that wire stock has been fed in and operations begun, the first operation on the stock is performed by the heading punch 32 to form the interlocking recess or cavity e1 in the upper surface of the forward element E and the corresponding projection e2 where the metal extruded in forming the recess flows into the depression of the heading die D1 on the shuttle bar or slide 30. The metal of the projection is pressed so firmly into the depression of the heading die that the element tends to remain in the die after the heading punch is withdrawn. But in order to hold the element firmly in the heading die during the heading operation and to hold the formed element in the die on the slide while it is being transferred from the forming station, there is provided a hold-down member 37 carried on the front end of a clamping plate 257 (Fig. 22) later to be described. The hold-down member 37 engages the wire stock immediately behind the portion at the end on which the head recess and projection are to be formed, that is, on the body and jaws of the forward embryo element on the wire stock, and holds it down during the heading and parting operations; then continues to engage and hold the formed element as it leaves the forming station and until it is engaged and held by suitable means at the jaw-spreading position.

The wire stock is held forward to prevent rearward movement which might be caused by the action of the heading punch, through the action of cooperating gripping devices 34 and 35 provided with sharpened V-shaped ribs or knives for engaging the stock. The lower gripping device 34 is fixed in position but the upper device 35 is adapted to be pressed downward just before and during the operation of the heading punch by a plunger rod 36. The gripping devices are placed as near the heading punch as construction will permit so as to avoid having wire stock between of sufficient length to buckle. The gripping devices may form nicks or notches in the wire but it is arranged that these will be located at points off the embryo elements. They may fall in a section which will be subsequently removed or they may be located accurately at either the front or rear end of the elements where they will assist in the operation by which the elements are severed from the stock. If located at the end of an element the nicks or notches, being V-shaped, produce a rounded or chamfered edge or at least avoid burrs or sharp edges on the elements. If located at the front end they may be made arcuate in shape to correspond to the arcuate shape of the nose e3 at the edge of the recess e1 in the head of the element.

After the head of the forward element E has been formed, a parting punch 40 operates to sever the forward element from the wire stock. At about the same time a piercing punch 41 operates to form an elongated jaw aperture e4 in an embryo element located at a point behind the forward element on the stock. When the parting punch 40 operates it not only severs the forward element from the next adjacent element but it produces a slot e5 from the rear end of the previously formed aperture e4 to the rear end of the element, thus completely disconnecting the jaws e6 from each other at the rear end. The jaws are not spread apart at this time but are formed and left in substantially the identical disposition they have when clamped on the tape.

The wire stock is fed along a tapered groove 42 of a lower clamping plate 256 beneath a rib 258 formed on the upper clamping plate 257 (Fig. 19). The stock is engaged when clamped adjacent the forming punches by spring-pressed stripper plungers 43 and 46, Fig. 12. The lower plunger 46 is provided with a spring 46a and means to limit its upward movement. The upper plunger 43 is provided with a leaf spring 44 and means to limit its downward movement. The spring 44 is secured to the clamping plate 257 by screws 45. The plungers 43 and 46 serve to remove the stock from the ribs or knives of the stock-gripping devices 34 and 35 when they are withdrawn so as to prevent the stock from being drawn across the knives to dull them during feeding movement of the stock.

After an element E has been completed and released from the forming tools at the forming station F it is carried by the slide toward one of the attaching stations A1 or A2. On the way it enters beneath a retaining plate 48 and while thus held in the heading die on the slide by the retaining plate with the ends of its jaws e6 protruding, it passes a jaw-spreading position J1 or J2. Here it encounters a V-shaped jaw-spreading wedge 49 which enters between the jaws to spread them apart. The wedge 49 is mounted on an oscillatable head 50 carried by a vertical shaft 51 so as to move in unison with the element. This coordinated movement of the wedge 49 may be secured by the interaction of a gear 52 on the shaft 51 with a meshing rack 53 carried by the slide.

After the element passes the jaw-spreading station it will clear the end of the retaining plate 48 and comes to a stop beneath a hold-down plate 56. The plates 48 and 56 are placed close together so as to retain the element on the slide at all times. As soon as the element comes to a stop the plate 56 is firmly pressed downward, for example by a hold-down plunger 57 to clamp the head of the element to the slide. The element is thus held securely against displacement or tilting in the die during its attachment to the tape, insuring that it will be properly disposed on the tape.

After the element has been clamped in attaching position the tape T is moved over to position the beaded edge thereof between the jaws of the element. This is effected by a tape-shifting member 58 which is mounted upon or formed integrally with a tape-shifting slide 59. The hold-down plate 56 may be formed with a recess 56a on its upper surface to receive the head of an element which has previously been attached to the tape. The tape is held taut between a tape tension device 60 and a tape-feeding drum 61 on a tape feeding shaft 62 so that the edge of the tape normally stands clear of the ends of the element jaws. The tape-shifting member forms a bow in the tape when moving it over to the jaws.

Figure 16:
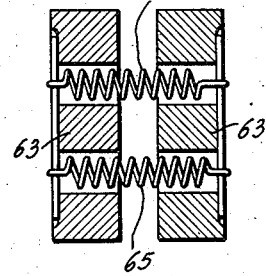
Fig. 16 is a vertical section taken on the line 16—16 of Fig. 11.
Figure 17:
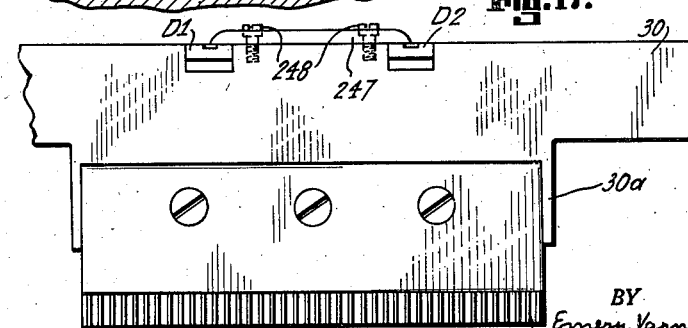
Fig. 17 is a vertical interior elevation taken on the line 17—17 of Fig. 11.

The tape-shifting slide 59 also carries a pair of clamping levers 63 mounted on a vertical pivot shaft 64 secured to the slide 59. The clamping ends of the levers 63 are normally held open by relatively strong tension springs 65 (Fig. 16) secured to the rear ends of the levers.

Any suitable means may be provided for operating the tape-shifting slide and the clamping levers. The means shown comprises (Figs. 9 and 11) a cam lever 70 mounted on a fixed journal 71 and provided at its upper end with a V-shaped spreading cam 72 disposed between opposed cam rollers 73 rotatably mounted on the rear ends of the clamping levers 63. A stop member 74 secured on the tape-shifting slide 59 is arranged to engage a fixed stop block 75 when the tape has been moved the desired distance into the element jaws. The tension of the springs 65 and the slope of the V-shaped cam 72 are so selected that the cam will first move the slide 59 over until it is halted by engagement of the member 74 with the stop block 75, after which further movement of the cam 72 will cause the clamping ends of the levers to close upon the jaws of the fastener element to clamp them to the tape.

As shown in Fig. 9 the clamping levers 63 are retained on the pivot shaft 64 by a lower sleeve 76 and an upper sleeve 77. An upper tape-shifting member 78 is clamped to the upper sleeve 77 and cooperates with the lower tape-shifting member 58 to keep the bowed section of the tape at the element jaws in vertical alignment.

The slide 59 may be moved back to its outer position after an element has been attached by any suitable means, as for example, by the springs 79 attached to the levers 63 carried by the slide and to the upper end of the lever 70.

The tapes may be fed in over grooved guide rolls 80, Fig. 3.

The operating parts of the machine (Fig. 7) are driven from a cam shaft 82 mounted in the main frame 83 and connected with a source of power by a sprocket 81 on the cam shaft and a drive belt or chain 84. By driving all parts from a single shaft, very accurate coordination of action may be achieved. This is very important in making elements with a good finish. In the present embodiment, for each revolution of the cam shaft two fastener elements are formed at the forming station F and one element is attached at each of the attaching stations A1, A2.

There are two punch heads, as shown in Fig. 6, one 85 for the heading punch 32 and another 86 for the parting punch 40 and the piercing punch 41.

Figure 13:
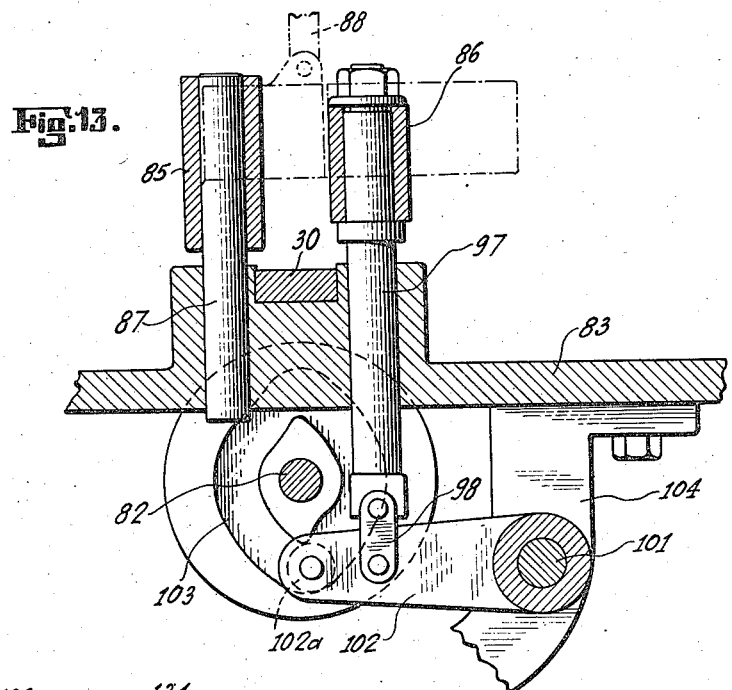
Fig. 13 is an enlarged partial vertical section taken on the line 13—13 of Fig. 3.

The heading punch head 85, as shown in Fig. 13, is mounted upon guide rods 87. It is operated by a link 88 and a bell crank lever 89 from a cam 90 secured to the cam shaft 82. The bell crank lever is pivoted upon a shaft 91 carried (Fig. 7) by upstanding brackets 92 constituting part of the fixed frame of the machine.

The parting and piercing punch head 86, as shown in Fig. 13, is mounted on guide rods 97. The head 86 is also operated through its guide rods 97 by links 98 attached to arms 102 mounted upon a rock shaft 101 actuated by a cam 103 on the cam shaft 82. The rock shaft 101 is mounted on depending brackets 104. One of the arms 102 carries a laterally disposed cam follower 102a cooperating with the face groove of the cam 103.

The lower ends of the cam levers 70 for the V-shaped spreading cams 72 at the element attaching stations, as shown in Fig. 9, are provided with cam rollers 107 which ride on cams 108 secured to the cam shaft 82. The cam rollers are held against their respective cams by springs 109.

The plunger rod 36 for operating the stock gripper device 35, as shown in Fig. 6, is urged upward by a coil spring 112. The upper headed end of the plunger rod 36, as shown in Fig. 20, is recessed to receive the rounded end of a removable push rod 113, the upper end of which is likewise rounded to fit into a socket in the lower headed end of an adjusting screw 114 threaded into an arm 115 clamped to a rock shaft 116. The rock shaft 116, Fig. 3, is mounted in upstanding brackets 117. At one end, as shown in Fig. 5, an arm 118 is secured to the rock shaft 116 and this arm is connected to a link 119 attached to a cam arm 120. The cam arm 120 is pivoted to a shaft 121 and is provided with a cam roller 122 operated by a cam 123 on the cam shaft 82. The link 119 is provided with a break joint 124 which permits the link 119 to be shortened and the push rod 113 to be quickly removed from the plunger rod 36 and the adjusting screw 114 when desired without disturbing the adjustment of its connections. This is convenient in removing the punch head 86, it being noted that the plunger rod 36 is slidably mounted in the punch head 86 and must be disconnected before the head can be removed.

Figure 14:
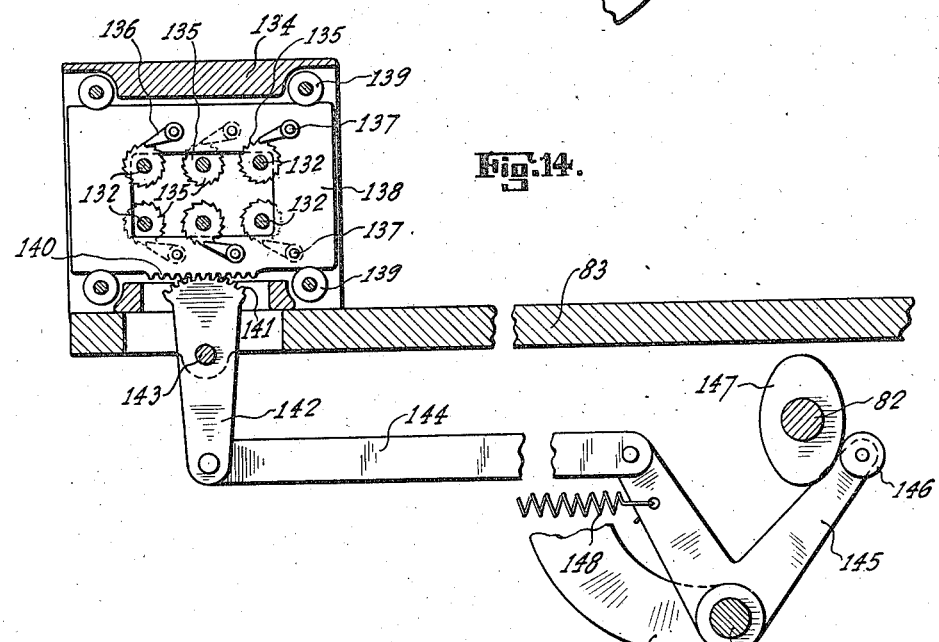
Fig. 14 is an enlarged partial vertical section taken on the line 14—14 of Fig. 3.

As shown in Fig. 3, the wire stock S is fed into the machine by staggered grooved rolls 130 and friction rolls 131. The rolls are secured to shafts 132. The shafts 132 are rotatably mounted in a fixed frame 134 and provided with ratchet gears 135. As shown in Fig. 14, the ratchet gears 135 are operated by pawls 136 secured to rods 137 carried by a feed slide 138. The pawls may be spring pressed toward their respective ratchet gears. The feed slide 138 operates between guide rollers 139 mounted on the frame 134. At its lower edge the feed slide 138 is provided with a rack 140 operated by a gear segment 141 formed on a rocking lever 142. The lever 142 is mounted on a shaft 143 and is operated by a link 144 connected to one arm of a bell crank lever 145. The other arm of the bell crank lever 145 is provided with a cam roller 146 actuated by a feed cam 147 secured to the cam shaft 82. The cam roller is kept in engagement with the cam by a spring 148. The bell crank lever 145 is mounted on a shaft 149 supported by brackets 150. This mechanism provides a very positive and accurate feed of the wire stock. If the stock feed mechanism tends to overfeed the stock its forward end is stopped by engagement with the back wall of the recess in one of the heading dies and the feed rolls will slip on the stock.

The tape-feeding drums 61 on the shaft 62 are provided with driving gears 155 which drive them in a forward direction. The drums may be so mounted on the shaft that they can be turned forward independently of the driving mechanism, as for example, by pulling the tapes forward. According to the illustrative embodiment the tapes are fed at different times at the two attaching stations, so the drums 61 are independently driven, but the driving means for each is identical and the illustration and description of the driving means for one will serve for both.

As shown in Fig. 3, the gears 155 for the drums 61 are driven by gears 156 on shaft 157 mounted, as shown on the right of Fig. 3, in tubular supports 158.

The tape-feeding shaft is driven by dual feeding mechanisms. One may be called the normal feeding mechanism for producing the normal spacing between individual elements, and the other may be called the jump-feed mechanism for producing the pump space between groups of elements on the tape.

As shown in Figs. 3, 4 and 5, the shaft 157 at its outer end is provided with a dual drive ratchet 159.

The ratchet 159 may be driven by any suitable mechanism for normal and jump feed. For normal feed, as shown in Figs. 3 and 5, an arm 172 at one end is provided with a hub rotatably mounted on the shaft 157 at one side of the ratchet 159 and this arm is provided with a pawl 164 cooperating with the ratchet on one side of the shaft axis. A spring 165 may be employed to hold the pawl toward the ratchet.

At its outer end the arm 172 is pivotally connected to an adjustable link 173. At its lower end the link 173 is pivotally connected to a block 174 mounted in a slot in a cam arm 175 pivoted on the shaft 121. Means are provided for securing the block 174 at any selected point along the slot to vary the stroke of the feed arm 172. The cam arm 175 is provided with a cam roller 177 operating upon a cam 178 secured to the cam shaft 82. A spring 179 maintains the cam roller 177 in engagement with the cam. Through this mechanism the tape at one of the attaching stations is fed upward one space for each revolution of the cam shaft 82. The tape at the other attaching station is similarly fed forward but in alternation with the feed of the first tape.

It will be understood that the jump feed mechanism does not operate regularly, that is, at each rotation of the cam shaft; but rather operates intermittently after a given number of fastener elements comprising a group has been secured to the tape. When the desired number of elements has been secured to the tape, certain trip mechanism is actuated to cause the jump feed mechanism to operate. After each operation the jump feed mechanism is returned to rest and conditioned for the next intermittent operation.

Preferably the tripping of the jump feed mechanism is controlled by electrical means under the supervision of number registering or automatic counting mechanism. By the means herein provided the number of elements in a group may be changed in an instant simply by adjusting the setting of the counter. Of course, the use of the counter-controlled electro-mechanical tripping mechanisms is well known in this and many related arts but the present invention is believed to provide distinct improvements, particularly in the manner and means for securing smooth accurate operation of the feeding mechanism and in the novel combination and function of the present mechanism.

The trip control mechanism, as shown in Figs. 3 and 4, may comprise a unit counter 184 of the re-set subtracting, or cancelling type, actuated at each rotation of the cam shaft as each fastener element is attached, by a link 185 operated by an eccentric device 186 on the shaft 82. Through suitable contacts and controls (not shown) the counter 184 causes actuation of a tripping solenoid 187 when a predetermined number of fastener elements comprising one group has been secured to the tape.

The jump feed mechanism, as shown in Figs. 3 and 4, includes an arm 190 provided with a hub rotatably mounted on the shaft 157 on the opposite side of the ratchet 159 from the arm 172 for normal feed, and the arm 190 is provided with a pawl 166 cooperating with the ratchet on the side of the shaft axis opposite the normal feed pawl 164. A spring 167 may be employed to hold the pawl 166 toward the ratchet. The outer end of the arm 190 is pivotally secured to an adjustable link 191 connected at its lower end to a block 192. The block 192 is mounted in the slot of a cam arm 193 pivoted on the same shaft 121 as that on which the slotted cam arm 175 for normal feed is mounted. The block 192 may be adjusted along the slot in the arm 193 by an adjusting screw 194, to vary the stroke of the arm and thus to vary the length of the space between groups of elements on the stringer.

The cam arm 193 may be provided with a cam follower 195 cooperating with a cam 196 secured to the cam shaft 82. A spring 197 urges the cam follower 195 towards its cam 196.

The end of the cam arm 193 is provided with an adjustable trip catch 198 cooperating with a trip latch 199 operated by the solenoid 187. The latch is normally urged into a position beneath the catch but is withdrawn when the solenoid is energized through the counter 184. An adjustable stop screw 200 is provided for limiting the outward movement of the trip latch 199.

The solenoid 187 is energized while the high portion 196a of the jump-feed cam 196 is positioned beneath the cam follower 195; consequently the cam follower always engages the cam without any drop whatsoever. This avoids noise and wear. After engagement the cam follower rides upon the cam for a full revolution and is thereafter automatically latched again in its uppermost position.

It may be here noted, as may be observed from the relative positions of cams 178 and 196 and their respective cam followers 177 and 195 in Fig. 4, that after the jump-feed impulse is given to release the cam follower 195 upon the highest part 196a of its cam 196, a fastener element will be attached to the tape while the cam follower 195 rides down the slope of the cam. But during the down stroke of the cam follower 195 and the cam arm 193 no feed of the tape is produced, as may be observed from the ratchet construction in Fig. 4. There is thus one more fastener element in the previous group than was registered by the counter when the jump-feed impulse was given. However, this is compensated for by reason of the fact that the normal feed mechanism operates every revolution and the cam 178 is positioned to actuate the cam follower 177 to feed the tape through a normal space after the completion of the jump-feed movement effected by and during the elevation of the cam follower 195 to its uppermost position by the high portion 196a of the cam 196.

The counter eccentric 186 also operates at every revolution of the cam shaft 82 and approximately at the same time that the normal feeding mechanism is operated by the cam 178, so that the counter registers the application of one fastener element before the element is actually applied. This compensates for the element which is applied after the jump-feed impulse is given and insures that the proper number of elements is placed in each group. A simple way of describing the operation is to say that the elements are counted before they are applied. This permits the operation of the trip-feed mechanism during the same part of the cycle as that in which the normal feed mechanism operates and, furthermore, permits operation of the normal feeding mechanism and the element applying mechanism during each period in which two elements are being formed at the forming station, that is, in the illustrative embodiment, at every revolution of the cam shaft.

An advantage in permitting the normal-feed or step-feed mechanism to operate after the periodic or jump-feed mechanism operates—in addition to avoiding the necessity of halting its operation—is to insure that the clutch rollers and other parts associated with the normal-feed mechanism will be returned to proper position for the next spacing operation.

Means are provided for re-setting the counter 184 for each group of fastener elements applied and for counting the groups. As shown in Fig. 4, this means comprises a re-set arm 205 secured to the jump-feed cam arm 193 and provided with an arcuate rack 206 meshing with a gear 207 on the re-set shaft 208 of the unit counter 184. A group counter 209 may be operated from the arm 205 through a link 210. The re-set mechanism returns the unit counter 184 to an initial condition after each group of elements has been secured to the carrier and at the same time registers the group as a unit on the group counter 209.

In addition to the feed adjustment provided by the tape feeding mechanism just described, a slight additional adjustment may be made by varying the tension in the tapes. Assuming the tapes to be made of slightly resilient material which tends to reassume its original length after temporary stretching, it will be understood that the greater the tension in the tape when elements are applied the shorter will be their spacing after the tension is relieved and the tape returns to its normal length.

Figure 10:
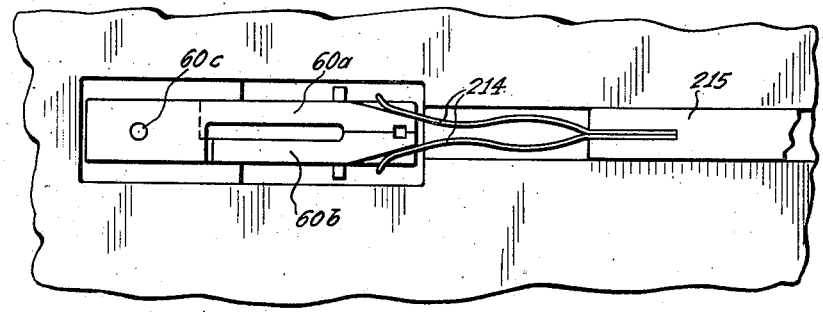
Fig. 10 is a plan view taken on the line 10—10 of Fig. 9, showing a detail.

The means herein provided for this purpose comprises the tape-feeding drums 61 and the tape-tension device 60 previously referred to. In order to carry the tape positively with the drum, the latter, as shown in Figs. 3 and 6, is provided with a circumferential row of short sharp replaceable pins 213 which engage the tape behind the elements. Presser rolls 217 may also be used to hold the tape firmly against the drum, as shown, in Fig. 21. These presser rolls may ride upon the ends of the pins 213 to force the pins into the tape. To avoid injury to the pins, the rolls 217 may be made of a soft material such as fibre. In order to vary the tension in the tape, the tape-tension device comprises (Figs. 9 and 10), two plates 60a and 60b hinged together by a pin 60c. The plates are pressed together on the tape by leaf springs 214 secured in the end of a tension adjusting slide 215. The slide may be moved axially in its guides by an adjusting screw 216 at the outer end. By moving the springs 214 toward the tension device 60 the tension on the tape is increased and by moving them away the tension is diminished.

Means are provided for regulating the position of the retaining plates 48 at the jaw spreading stations J1 and J2 and for mounting the hold-down plates 56 at the element applying stations A1 and A2. This mechanism is shown in Figs. 6, 8 and 9. Here it will be seen that a support 222 is secured to a slide adjusting bar 223 by a screw 224, the adjusting bar 223 in turn being secured to the main frame by screws 225. On each side of the support 222 there is mounted a pivoted member 226. The parts on each side of the support 222 are alike so a description of one will serve for both.

The member 226 is mounted upon a pivot pin 227 and at its rear end is engaged by adjusting screws 228 and 229 mounted in the support 222 above and below the pivot pin 227 respectively. Clamping screws 230 passing through oversized holes in the pivoted member 226 are adapted to secure the member 226 firmly in adjusted positions to the side of the support 222. The retaining plate 48 is secured to the front end of the pivoted member 226, as shown in Fig. 8.

As shown in Figs. 8 and 9, the pivoted member 226 is provided with a lateral extension 233 to which the hold-down plate 56 at the attaching station is pivoted by a pivot pin 234. The plate 56 is urged downward by leaf springs 235 secured to the lateral extension 233 by a clamp plate 236 and set screws 237.

In Fig. 9 it may also be noted that the hold-down plunger 57, which applies additional pressure on the hold-down plate 56 during the attaching period, is provided with a head 57a mounted in a retaining member 238 secured to the heading punch head 85. A coil spring 239 acts upon the head of the plunger. The plunger 57 is lifted clear of the plate 56 when the punch head 85 withdraws and is brought down on the plate when the punch head descends, as when forming the head of a fastener element at the forming station.

Means are provided for maintaining the die slide 30 in proper position. This is important because the fastener elements are very small and if the dies on the slide are not maintained very accurately in position the fastener elements will be imperfect. As shown in Figs. 7 and 9, the slide 30 operates in close fitting guides in the main frame 83. The slide is thickened in the die operating portion and slides upon the inclined upper surface 242a of a bed plate 242. The bed plate 242 is also provided with a horizontal upper surface 242b disposed below the slide adjusting bar 223 previously mentioned. The bed plate 242 may be moved to maintain the slide against the upper surface of its guides by an adjusting screw 243 threaded in an upstanding bracket 244 secured to the main frame 83. The slide adjusting bar 223 may be adjusted in position against the back of the slide 30 by an adjusting screw 245 which is also threaded in the bracket 244. After adjustment both the slide adjusting bar 223 and the bed plate 242 on which it rests are securely anchored to the main frame by the screws 225 previously mentioned. The slide adjusting bar 223 on its front face is provided with a hold-down rib 223a entering a corresponding groove in the rear face of the slide 30. This prevents the slide from tilting up at the rear edge and down at the front edge when the head punch operates.

The heading dies D1 and D2 may be retained on the slide by any suitable means. As shown in Figs. 7 and 8, the means hereby provided comprises the clamping plate 247 and the clamping screws 248 securing the plate to the slide.

The slide 30 may be operated by any suitable means. As shown in Fig. 7, the slide is provided with a cam follower roller 250 operating in the circumferential groove of a drum-type cam 251 secured to the cam shaft 82. The cam 251 is provided with two opposed straight portions 251a and two opposed inclined portions 251b. While the cam follower 250 is located in the straight portions 251a of the grooves the slide is held stationary for the heading and attaching operations; and while the cam follower is located in the inclined portions 251b of the groove the slide is being moved endwise for the succeeding operations. To insure accuracy of location when the slide is halted, the drum of the cam 251 may be provided with straight knives or ribs 251c entering notches 30b formed in the lower surface of the slide 30.

The punches and certain associated devices at the element forming station F have already been described. There is also located at the forming station, certain stock holding mechanism and other parts which will now be described.

The stock holding mechanism comprises (Figs. 12 and 19) associated plates 256 and 257. The lower plate 256 is provided with the tapered groove 42 already referred to for receiving the wire stock S. The upper plate 257 is provided with the rib 258 disposed within the groove 42. The lower plate 256 is secured to a die block 263 by screws 259 (Fig. 11) keys 260 and 261 also being employed, if desired, to hold the plate 256 securely in place. The forward end of the lower plate abuts against a piercing die 262 which is firmly anchored in the die block 263 secured to the main frame (Fig. 6) by screws 264. The piercing die, of course, cooperates with the piercing punch 41.

Figure 11:
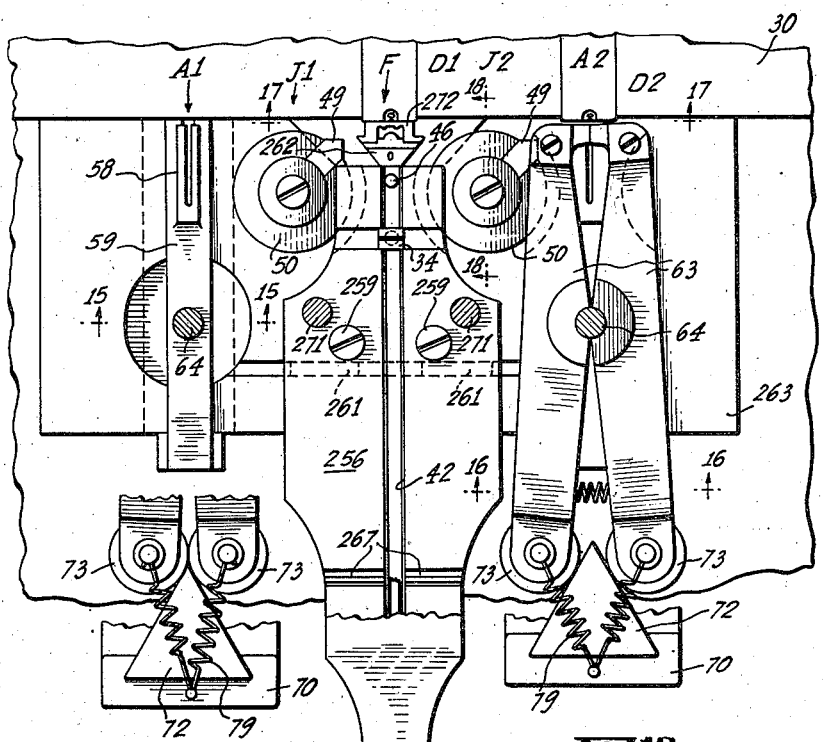
Fig. 11 is an enlarged plan view, partly in section, taken on the line 11—11 of Fig. 9.
Figure 15:
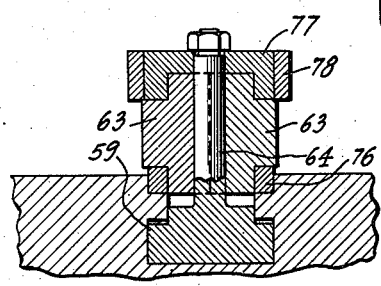
Fig. 15 is a vertical section taken on the line 15—15 of Fig. 11.

It is provided that the upper stock clamping plate 257 will have a slight rocking movement on the lower plate 256 in order that the front end of the plate 257 may be moved down to more closely engage the stock during element forming operations. As shown in Figs. 11 and 12, the lower plate 256 near its outer end and in suitable transverse grooves is provided with raised rocker ribs 267 and the upper plate 257 is provided with cooperating hardened rocker plates 268 secured in transverse recesses in the plate by screws 269. The plates 256, 257 are normally urged apart at their front ends by one or more embracing springs 270 at their rear ends. The plate 257 is prevented from rising too high at its front end by the heads of retaining screws 271 secured in the lower plate 256. The stock gripping devices, 34 and 35 are firmly secured, as by heat shrinking or otherwise, in the respective plates 256 and 257; consequently when the plunger 36 presses down on the gripping device 35 it moves the front end of the plate 257 down also.

A parting die 272 (Fig. 12) is secured to the die block 263 in position to cooperate with the parting punch 40.

In operation, the wire stock S is fed forward at each turn of the cam shaft 82. At each turn of the shaft all of the element forming devices are operated to completely form and sever two elements. It is true that some of the operations are performed upon embryo elements which are approaching the finishing position but every operation required to form an element is performed in one forming period. The shape of the stock supplied and the nature and sequence of operations of the machine provide for this beneficial result.

At the time the stock is fed it is free of all holding and forming mechanism so as to be moved without resistance; and the slide 30 is held stationary with one of the heading dies D1 or D2 in position to receive the front end of the stock.

After the stock has been fed forward, the front end of the upper stock holding plate 257 is forced down by the plunger 36 to closely confine the stock and grip it between the gripping devices 34 and 35. This causes the stripper plungers 43 and 46 to be pushed back against their respective springs.

The heading punch 32 now acts through descent of the press head 85 to form a head recess e1 and projection e2 on the forward end of the stock. The element is still connected with the body of the stock and its rear end is held down by the member 37 when the heading punch acts.

The press head 86 descends to operate the parting punch 40 and the piercing punch 41. The parting punch may lead the piercing punch slightly and both are preferably operated while the heading punch 32 and the gripping devices 34 and 35 are still in engagement with the stock.

The punches 32, 40 and 41 are withdrawn; but for a short time thereafter while the finished element begins its transfer movement with the slide 30 and until the head of the element enters beneath one of the retaining plates 48, the plate 257 is still held down by the plunger 36 to keep the hold-down member in engagement with the finished element.

Thereafter the plunger 36 retracts and permits the front end of the plate 257 to rise to release the stock, the action of spring 270 on the rear end of the plate 257 causing this movement. During this action the stripper plungers move out under the action of their springs to strip the stock from and hold it clear of the knives of the gripping devices 34 and 35.

Between the time when the element is formed at the forming station F and the time it is attached at an attaching station A1 or A2, the jaws are spread at one of the jaw spreading stations J1 or J2. In the above-described embodiment this is accomplished while the element is in motion by a spreading wedge 49 which turns in synchronism with the movement of the element.

When the element is halted at an attaching station its head is securely clamped in the die on the slide by the hold-down plate 56, the plunger 57 descending with the heading punch head 85 for this purpose. An element is thus being secured to a tape at one of the attaching stations while another element is being formed at the forming station. During the same time the tape is being fed forward at the other attaching station. This provides extra time for the tape-feeding operation—a matter of considerable importance, since heretofore it has been found necessary to stop or delay the element-forming operation when feeding the tape between groups or to hurry the tape-feeding operation unduly.

After the element has been halted in attaching position the tape is pushed over by the members 49, 78 until its beaded edge enters the jaws, whereupon the clamping levers 63 are operated to close the jaws on the tape. As the lever 70 and wedge 72 withdraw the clamping levers 63 are opened by the springs 65 and the tape is pulled back by the members 49, 78 through the action of connecting springs 79. The element just attached will have been released from the hold-down plate 56. The tape is then fed upward by rotation of the tape-feeding drums 61. The tape-feeding action is very positive because of the engagement therewith by the pins 213 on the drum 61. The pins 213 are separately attached to the drum so as to be replaceable if worn, broken or bent.

The tape-feeding mechanism for normal or step feed and for periodic or jump feed has been described in detail so its operation will be clear without further explanation. Also the other details of the apparatus and the operation thereof will be clear from the above description.

It will thus be seen that the invention provides distinct improvements in the method and apparatus for forming and attaching slide fastener elements as well as in the elements themselves.

By supplying stock of the shape disclosed and operating upon it in the manner described it is possible to produce elements of the preferred type which are accurately shaped and free from burrs and sharp edges. This obviates tumbling operations, assures smooth action with a slider in use, and reduces the danger of injury to persons who use the fasteners.

The elements are formed in such a manner that the longitudinal surfaces of the stock are preserved in the elements as attached to the tapes.

At the forming station the stock is not increased in size in any lateral direction thus simplifying the guides and tools necessary for holding and forming the elements.

The heads of the elements are formed while the elements are still attached to the stock whereby the stock may be securely held while the heads are formed. Due to this and the fact that no operations are performed on the stock in the region of the heads after they have been formed, it is possible to produce substantially perfect heads which will have smooth easy action in use.

The stock holding mechanism has many advantages in operation and may be taken apart almost instantaneously for repair, replacement or cleaning.

The elements are formed with a minimum waste of stock, only the parting and piercing blanks being lost.

One complete element is formed for each stroke of the punch presses, insuring rapid and economical production.

The elements are formed individually directly from the stock thus avoiding parting or other forming operations on small pieces of stock. The only operation required after the elements leave the forming station are the jaw spreading and clamping operations. These are not forming but shaping operations and cause no permanent distortion of the elements. Moreover, they are light operations so that it is not difficult to hold the elements properly therefor.

The jaw-spreading operation is performed between the forming and attaching stations so as not to interfere with operations at either station. This simplifies the mechanisms required at these stations.

One forming station supplies a number of attaching stations. This increases the permissible time for normal and jump feed of the tape, avoiding delay or improper operation for the critical tape-feeding operation.

The specific jaw-spreading mechanism provided is extremely simple and rapid and efficient in its operation.

The attaching mechanism also is very simple and rapid and efficient in its operation.

The tape feeding mechanism provided is accurate and rapid in operation and does not interfere with or delay the normal operations of the machines. It also operates easily and with minimum noise. The special counters and trippers and feed adjustments provided enable the operator to change the feed, spacing, or number of elements in a group almost instantaneously.

The stock feeding mechanism operates positively but without the possibility of marring the stock or breaking the feeding mechanism. The provision of staggered sets of smooth-and-grooved feed rolls insures that no fins will be formed on the stock.

The means provides for mounting, moving and adjusting the carrier or slide on which the elements are partly formed and by which they are transferred insures accurate positioning of the dies carried thereon and provides smooth controlled operation.

The enumeration of the above advantages is not intended to exclude others which inhere in the invention or in the illustrative embodiment thereof which has been disclosed. It is to be understood that the invention is not limited except by the prior art and the scope of the subjoined claims.

I claim:

1. The method of forming slide fastener elements of the block type having nesting heads and clamping jaws aligned with the heads, which comprises, providing wire stock having substantially the exact cross-sectional size and shape of the finished elements, gripping the wire stock a short distance behind its forward end to hold it against backward movement by means forming nicks therein but said nicks being located at points which will lie off the elements formed from the wire stock, forming a head on the embryo element at the forward end of the wire stock, piercing the wire stock to form embryo jaws for an element behind the headed element, and severing the headed element from the wire stock and disconnecting the jaws of the headed element at their rear ends.

2. The method of forming slide fastener elements, each having a head and a single pair of jaws, comprising in combination, feeding into a heading die the forward end of a strip of wire stock having partially formed or embryo elements thereon, forming a head on the forward end of the forward element on the wire stock, and subsequently severing the headed element from the wire stock while holding the head of element in the heading die.

3. The method of forming slide fastener elements, each having a head and a single pair of jaws, comprising in combination, forming a head on the forward end of a strip of wire stock having thereon embryo elements, while the end of the wire is disposed in a die on a transfer device, severing the headed element at the end of the wire from the wire stock to leave the headed element in the die with its jaws protruding, and transferring the finished element from the forming position with the die on the transfer device.

4. The method of forming slide fastener elements, each having a head and a single pair of jaws, comprising in combination, forming a head on the forward end of a strip of wire stock having thereon embryo elements, while the end of the wire stock is disposed at a forming station in a die on a transfer device, severing the headed element from the end of the wire stock to leave the headed element in the die with its jaws protruding, transferring the finished element by the transfer device to an attaching station, and spreading the jaws of the element between the forming station and the attaching station.

5. The method as set forth in claim 4, further characterized by the fact that the jaws of the element are spread while the element is in motion.

6. The method of forming and attaching slide fastener elements, which comprises, forming the head on an element in a transfer die while the element is still integrally attached to a strip of stock, severing the element from the strip, transferring the element in the transfer die, and attaching the element to a tape while the head is still in the transfer die.

7. The method of forming and attaching slide fastener elements, which comprises, successively forming the heads and partially forming the jaws of fastener elements while the elements are still attached to a strip of stock, the heads being formed successively on the extreme forward end of the strip of stock, and the jaws being formed in the fully closed position they will assume when subsequently attached to a carrier or tape, successively severing individual elements from the strip of stock and simultaneously completing the formation of the element jaws, transferring the severed elements while their heads are held in the forming die, spreading the jaws while the elements are held in the head forming die, and attaching the elements to a tape while they are held in said die.

8. The method of forming and attaching slide fastener elements of the block type having nesting heads and clamping jaws aligned with the heads, which comprises, providing wire stock having substantially the exact cross-sectional size and shape of the finished elements, forming a head and jaws on the elements, severing the elements from the wire stock, transferring the elements from the forming position while held by the head with the jaws protruding, spreading the jaws, and clamping the elements by their jaws upon a carrier or tape.

9. The method of forming and attaching slide fastener elements, which comprises, forming elements successively at a forming station, passing alternate elements as formed to alternate attaching stations, and securing an element to a carrier or tape at one of the attaching stations while forming the next successive element at the forming station.

10. The method of forming and attaching slide fastener elements, which comprises, forming elements successively at a forming station, passing alternate elements as formed to alternate attaching stations, and securing an element to a carrier or tape at one attaching station while feeding forward a carrier or tape at the other attaching station, and while forming an element for said other attaching station at the forming station.

11. The method of forming and attaching slide fastener elements, which comprises, forming elements successively at a forming station, passing alternate elements as formed to alternate attaching stations, securing an element to a carrier or tape at one of the attaching stations while forming an element for the other attaching station at the forming station, and during the same time feeding a carrier or tape forward through a normal element-spacing distance at the other attaching station, and also periodically feeding the tape forward through a greater distance during the same period to provide inter-group spacing.

12. Apparatus for forming slide fastener elements, comprising in combination, means for feeding a continuous length of wire stock, means for piercing the wire stock at a distance from its forward end to form embryo jaws in closed position thereon, means embracing the entire forward end of the wire stock for forming heads for successive elements thereon while still attached to the wire stock, and means for severing elements successively from the forward end of the wire stock and completing the formation of said jaws in closed position.

13. Apparatus for forming slide fastener elements comprising in combination, means for feeding a continuous length of wire stock, means associated with a transfer carrier for holding the head end of an embryo element which is integrally connected with the wire stock, and means for severing elements from the stock and completing jaws therefor while the forward end is held on said carrier.

14. Apparatus for forming slide fastener elements, comprising in combination, means for feeding a continuous length of wire stock, an element carrier, means associated with said carrier for successively forming element heads on the end of said wire stock while positioned in a die on said carrier, and means at a fixed position off said carrier for performing operations on the stock at a distance behind the front end.

15. Apparatus for forming slide fastener elements, comprising in combination, a carrier for supporting a fastener element by the head with the jaws projecting, and means for spreading the jaws while the element is in motion.

16. Apparatus as set forth in claim 15 in which said jaw spreading means comprises a turnable wedge coordinated in its movement with the movement of the element on the carrier.

17. A machine for forming and attaching slide fastener elements, comprising in combination, a transfer carrier, a plurality of dies on said carrier, means at a single forming station for forming elements and positioning them on dies on said carrier, and means at a plurality of attaching stations for securing elements to a plurality of tapes when the dies on said carrier arrive with the elements at the attaching stations.

18. A machine for forming and attaching slide fastener elements, comprising in combination, a transfer carrier, a plurality of heading dies on said carrier, means for feeding the forward end of a continuous length of wire stock into a heading die at an element forming station, a heading punch cooperating with said heading die to form a head for an element at the forward end of said wire stock while the element is still integrally connected with the wire stock, means for severing formed elements from the end of the wire stock while holding them in a die with the jaw ends protruding, means at a jaw-spreading station for spreading the jaws of elements on said carrier, and means at a plurality of attaching stations for attaching elements to a plurality of tapes while the elements are held in dies on said carrier.

19. Apparatus for forming and attaching slide fastener elements, comprising in combination, means for supplying formed elements, means for attaching elements to a tape, and means for feeding the tape, said feeding means including a unit counter provided with means for affecting an electrical circuit after a predetermined number of elements comprising a group has been secured to the tape, a normal unit feed device, a jump feed device including a constantly rotating cam and a cam follower, and a solenoid latch controlled by said counter for releasing the cam follower when the high part of the cam is adjacent the follower, for the purposes set forth.

20. Apparatus as set forth in claim 19, which further includes in combination, a group counter, and means operated by said cam follower for resetting said unit counter to initial position and operating said group counter.

21. The method of forming and attaching slide fastener elements, which comprises, forming elements successively at a forming station in cooperation with dies on a carrier, passing elements as formed with the dies on the carrier selectively to one and another of a plurality of attaching stations, and securing an element to a tape at one of the attaching stations while forming the next successive element at the forming station.

22. The method of forming and attaching slide fastener elements, which comprises, forming elements successively at a forming station in cooperation with dies on a carrier, passing elements as formed with the dies on the carrier selectively to one and another of a plurality of attaching stations and there securing them to a tape, and selectively moving tapes through unit step feed distances and greater inter-group feed distances at the stations in coordination with the continued production of elements at the forming station.

23. Apparatus for applying slide fastener elements to stringers or tapes, comprising in combination, a carrier, means for supplying fastener elements to said carrier at one station with the jaws of the elements protruding, a plurality of fastener applying stations along said carrier, fastener applying means at said stations for applying fastener elements to the tapes while the heads of the elements are still carried by said carrier, and means for coordinating the supply of fastener elements to said applying stations with the continued operation of the element supplying means.

24. Apparatus as set forth in claim 23 which further includes in combination, means for feeding the tapes forward, and means for securing regular unit spacing and intermittent larger inter-group spacings for each of said tapes in coordination with the supply of fastener elements to said carrier.

25. Apparatus as set forth in claim 23 which further includes in combination, means at a jaw spreading station along said carrier for spreading the jaws of the fastener elements as they progress from the supply station to the applying stations, means for feeding the tapes forward, and means for securing regular unit spacing and intermittent larger inter-group spacings for each of said tapes in coordination with the supply of fastener elements to said carrier.

26. The method of forming slide fastener elements which comprises, feeding forward endwise in steps a strip of wire stock to a forming station, piercing the stock at unit distances to form embryo jaws in closed position behind the portions which form the interlocking heads, feeding the forward end of the stock into position for engagement of the forward head portion of an element in a head forming die on a transfer carrier, and forming a head on an element and severing it from the wire stock while in the forward position after the embryo jaws have been formed.

27. The method as set forth in claim 26 further characterized by the fact that the jaws are separated by said severing operation and also by the fact that the head forming means holds the elements in the head forming die until all the forming operations at the forming station have been completed.

28. The method as set forth in claim 26 further characterized by the fact that the completed elements are held by their heads with their jaws protruding in the heading die on the transfer carrier.

29. The method as set forth in claim 26 further characterized by the fact that the completed elements are held by their heads with their jaws protruding in the heading die on a transfer carrier, and moving the elements on the carrier to another station and there spreading the jaws apart.

30. The method as set forth in claim 26 further characterized by the fact that the completed elements are held by their heads with their jaws protruding in the heading die on a transfer carrier, moving the elements on the carrier to another station and there spreading their jaws apart, and moving the elements with spread jaws to another station and there attaching them to a tape.

31. Apparatus for forming slide fastener elements, comprising in combination, means for feeding forward endwise in steps to a forming station a strip of wire stock, means for piercing the stock at unit distances to form embryo jaws in closed position behind the portions which form the interlocking heads, a head forming die mounted on a transfer carrier into which the head portion of the element is fed at the end of their forward movement, means cooperating with said head forming die to form interlocking heads on the elements, and means for severing the elements from the wire stock.

32. Apparatus as set forth in claim 31 further characterized by the fact that said severing means completes the formation of the jaws in closed position, said head forming means holding an element in the head forming die until all the forming operations at the forming station have been completed.

33. Apparatus as set forth in claim 31 which further includes in combination, means at a station other than the element forming station for spreading the protruding jaws of said elements.

34. Apparatus as set forth in claim 31 which further includes in combination, means at a station other than the element forming station for spreading the protruding jaws of said elements, and means at another station for attaching the protruding jaws to a tape.

35. The method of making slide fasteners which comprises, feeding elements head first and holding them with their separated but unspread jaws protruding on a transfer carrier, moving the elements to a jaw spreading station and there spreading the jaws, and subsequently moving the elements to an attaching station and there securing them by their protruding jaws to a tape.

36. Apparatus for making slide fasteners comprising in combination, a carrier, means at a first station for feeding slide fastener elements head first to the carrier, means for holding the slide fastener elements on the carrier with their jaws protruding, means for advancing the carrier means at a second station for spreading the protruding jaws, and means at a third station for clamping the jaws upon a tape.

37. Apparatus for making slide fasteners, comprising in combination, a carrier, means at a feeding station for feeding slide fastener elements head first to the carrier, means for holding the slide fastener elements on the carrier with their jaws protruding, means for advancing the carrier means for spreading the protruding jaws while the elements are maintained on the carrier, and means at a plurality of attaching stations for selectively attaching the elements to a plurality of tapes.

38. The method of forming and attaching slide fasteners elements which comprises, continuously supplying formed fastener elements by unit delivery mechanism at unit intervals to an element carrier at one station, holding the elements on the carrier, moving the carrier at unit intervals to carry an element to one of a plurality of stations for attaching the elements delivered thereto to a stringer, and continuously attaching the delivered elements, while held on the carrier, at the aforesaid attaching stations to the stringers at multiple-unit intervals.

39. The method as set forth in claim 38 further characterized by the fact that the jaws of the elements are spread apart at unit intervals while on said carrier.

OSBORNE FIRING.